United States Patent [19]

Hong et al.

[11] 4,331,129
[45] May 25, 1982

[54] SOLAR ENERGY FOR LNG VAPORIZATION

[75] Inventors: Charles C. Hong, Columbus; David E. Price, Plain City; William F. Morse, Columbus, all of Ohio

[73] Assignee: Columbia Gas System Service Corporation, Columbus, Ohio

[21] Appl. No.: 55,008

[22] Filed: Jul. 5, 1979

[51] Int. Cl.³ .............................................. F24J 3/02
[52] U.S. Cl. .................................... 126/427; 126/435; 126/900; 62/52
[58] Field of Search ............... 126/452, 900, 435, 420, 126/427, 432; 62/52, 53; 237/80, 81

[56] References Cited

U.S. PATENT DOCUMENTS

| | | | |
|---|---|---|---|
| 1,588,699 | 6/1926 | Brooks | 122/32 |
| 2,335,837 | 11/1943 | Abramson | 62/52 |
| 3,145,707 | 8/1964 | Thomason | 126/432 |
| 3,452,548 | 7/1969 | Pitaro | 62/53 |
| 3,720,057 | 3/1973 | Arenson | 60/39.02 |
| 3,724,229 | 4/1973 | Selber | 62/52 |
| 3,726,085 | 4/1973 | Arenson | 60/36 |
| 3,726,101 | 4/1973 | Arenson | 62/52 |
| 3,867,818 | 2/1975 | Tornay | 62/52 |
| 3,892,103 | 7/1975 | Antonelli | 62/58 |
| 3,978,663 | 9/1976 | Mandrin et al. | 60/39.67 |
| 4,003,363 | 1/1977 | Grossman | 126/450 |
| 4,004,380 | 1/1977 | Kwake | 52/2 |
| 4,033,326 | 7/1977 | Leitner | 126/415 |
| 4,037,652 | 7/1977 | Brugger | 126/435 |
| 4,057,048 | 11/1977 | Maine | 126/440 |
| 4,063,419 | 12/1977 | Garrett | 126/435 |
| 4,143,642 | 3/1979 | Beaulieu | 126/435 |
| 4,253,446 | 3/1981 | Muller | 126/435 |

Primary Examiner—Carroll B. Dority, Jr.
Attorney, Agent, or Firm—Millard & Cox

[57] ABSTRACT

Disclosed is an apparatus for vaporizing a normally gaseous fluid which is in liquefied state which apparatus employs solar energy for heating a second fluid which preferably is water, which solar heated second fluid is passed into heat exchange relationship with said liquefied gaseous fluid for its vaporization. The preferred liquefied gaseous fluid is liquefied natural gas (LNG) and the second fluid preferably is water which optionally contains an anti-freeze additive for prevention of freezing of the water during the operation.

4 Claims, 7 Drawing Figures

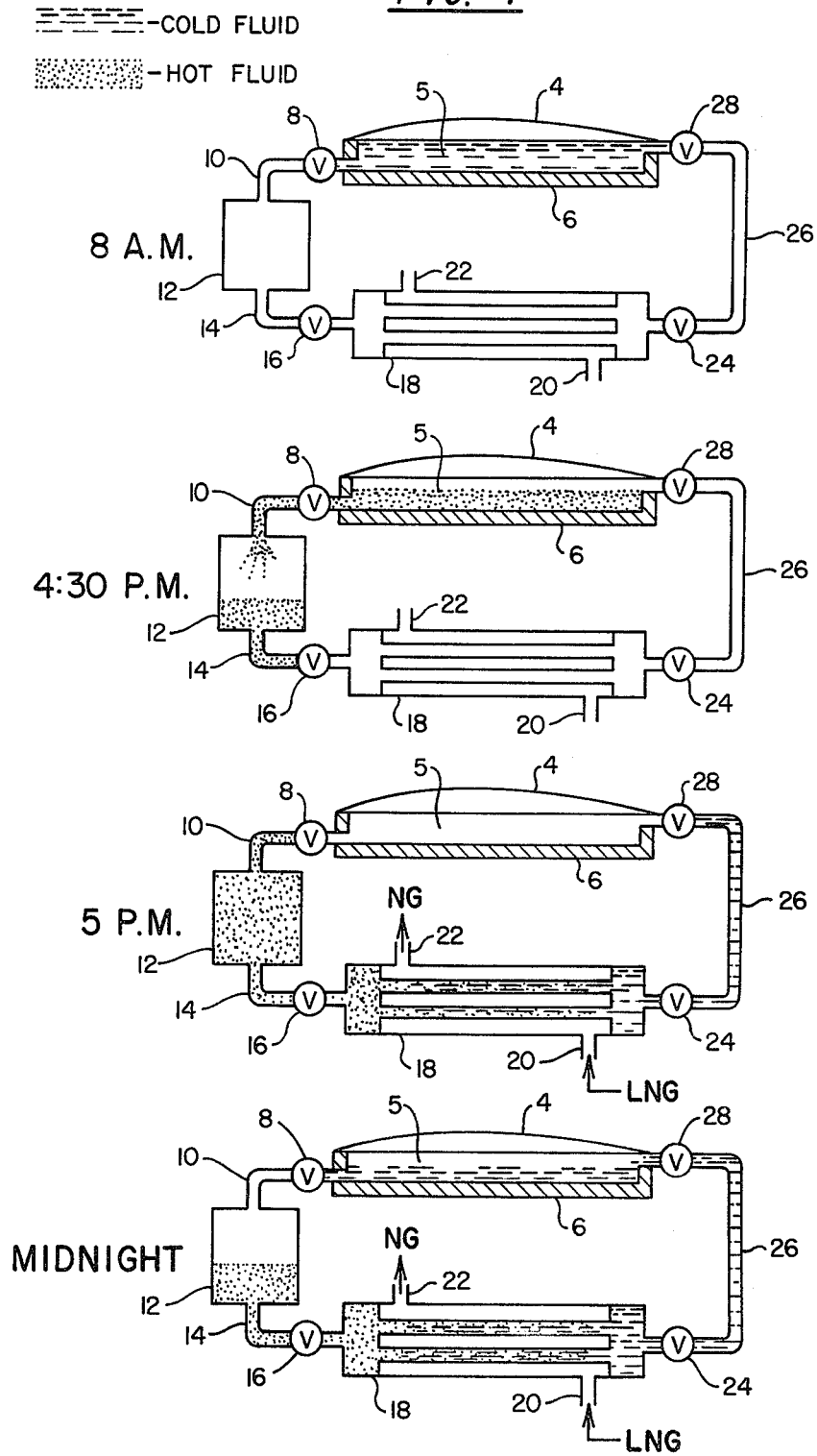

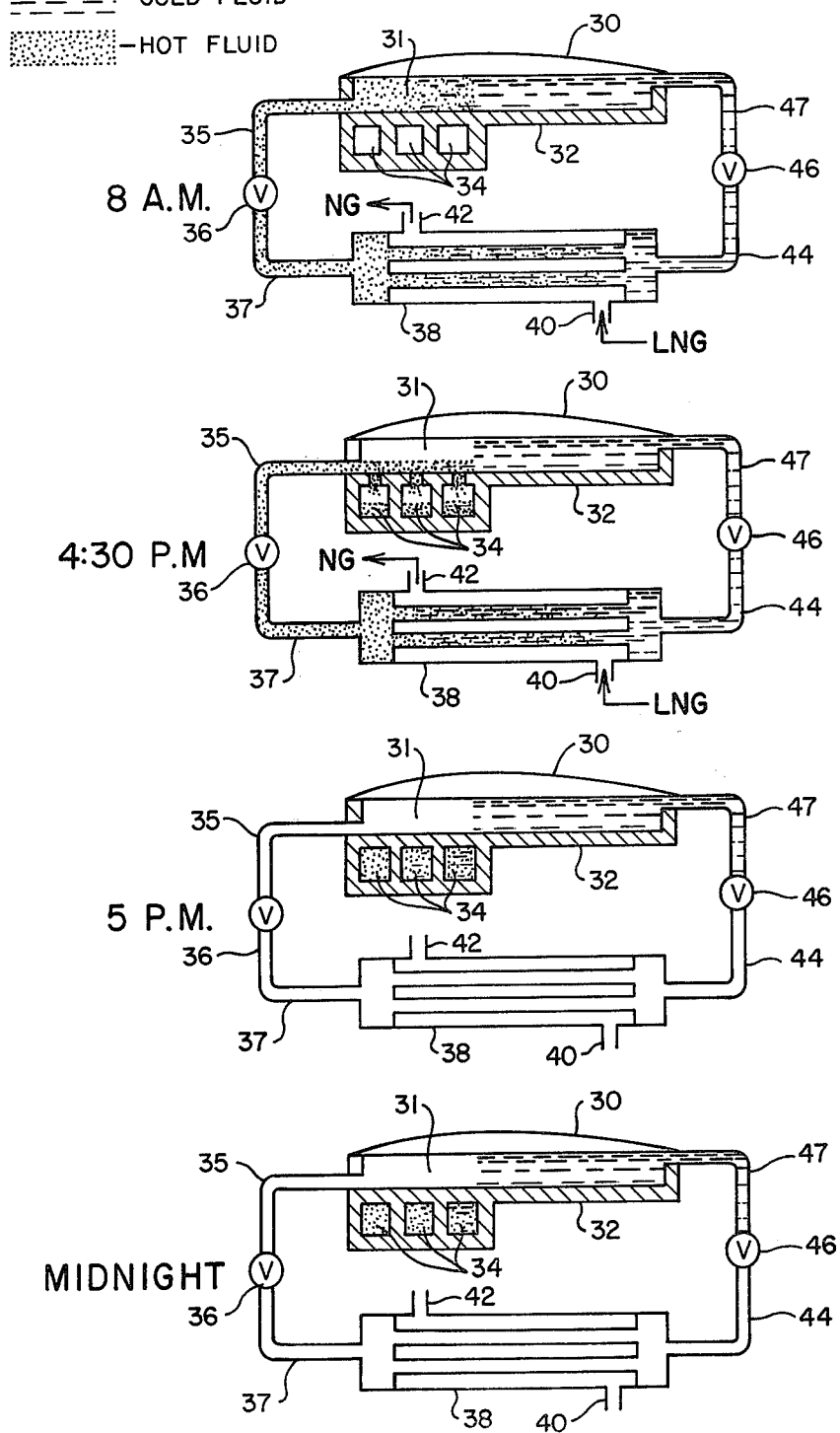

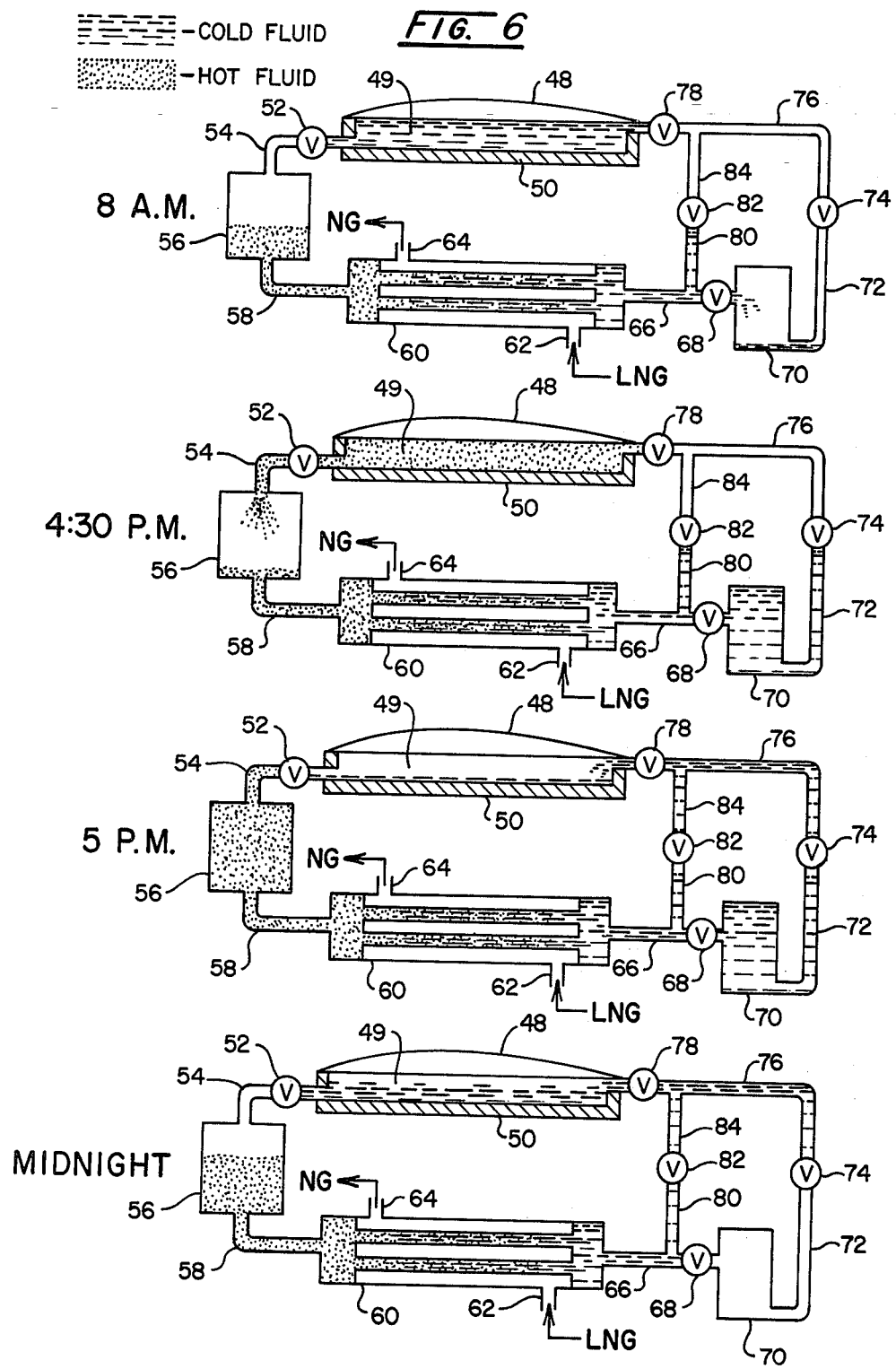

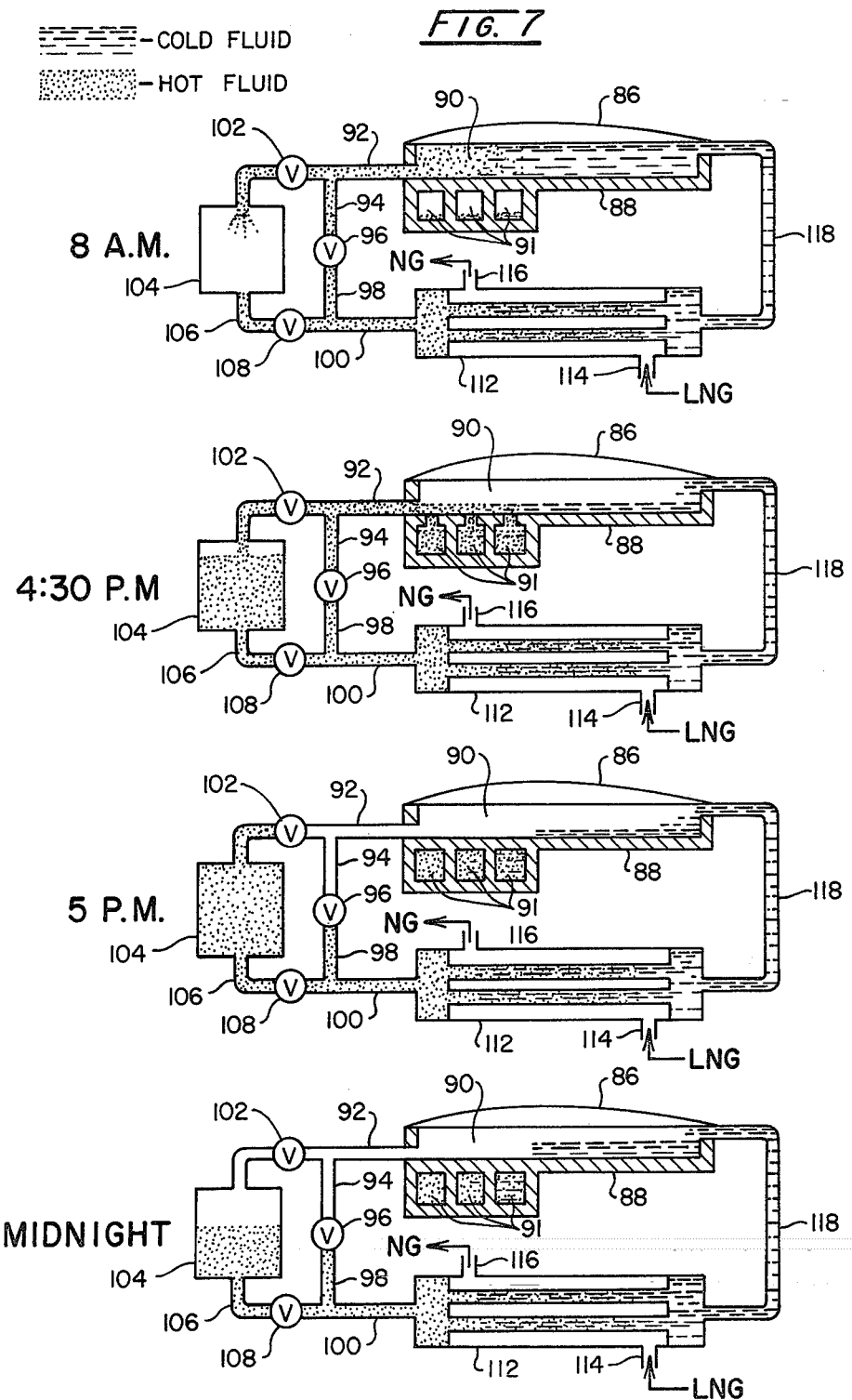

SOLAR ENERGY FOR LNG VAPORIZATION

BACKGROUND OF THE INVENTION

The present invention relates to the regasification or vaporization of normally gaseous fluids in liquefied state and more particularly to the use of solar energy for such vaporization.

Natural gas, for example, often is available in areas remote from where it ultimately will be used. Often, shipment of such natural gas involves marine transportation which makes it desirable to bulk transfer the natural gas by liquefying the natural gas so as to greatly reduce its volume for transportation at essentially atmospheric pressure. Under these conditions, the liquefied natural gas (hereinafter referred to as LNG) is at a temperature of approximately $-162°$ C., though heavier hydrocarbons (such as, for example, ethane, propane, butane, and the like) often vary the boiling point range of the LNG to between about $-133°$ and $-168°$ C. Heretofore, a wide variety of heat transfer fluids have been proposed for the regasification or vaporization of LNG. Such heat transfer fluids include air (U.S. Pat. No. 3,978,663), ambient water (U.S. Pat. Nos. 3,726,101; 3,726,085; and 3,720,057), distillate from hydrocarbon distillation columns (U.S. Pat. No. 3,452,548), sea water often in conjunction with a desalinization process (U.S. Pat. Nos. 3,724,229; 3,892,102; and 3,892,103), and like fluids. It even has been proposed to vaporize liquid chlorine with ambient water (U.S. Pat. No. 1,588,699).

In all of the foregoing prior art proposals, the heat transfer fluid can be at ambient temperature, be heated by conventional fuel fired heaters, be heated by turbine exhaust gas and the like. However, the application of solar energy for the regasification of normally gaseous fluids in liquefied state has not been advocated in the art, nor has an efficient and economic solar energy system for such regasification been proposed.

BROAD STATEMENT OF THE INVENTION

One aspect of the invention is an improvement in process wherein solar heated water is passed into a heat exchange relationship with the medium which is at a lower temperature than the temperature of said solar heated water, the water in said process being exposed to a condition adequate for freezing at least a portion of said water during said process. Such improvement comprises admixing with said water a sufficient proportion of an additive which prevents said freezing of said water. Another aspect of the invention is a process for vaporizing a normally gaseous fluid which is in liquefied state which comprises passing a solar heated second fluid into heat exchange relationship with said liquefied gaseous fluid for vaporizing same. Yet another aspect of the invention is an improvement in a process for vaporizing a normally gaseous fluid which is in liquefied state wherein a second fluid is fed to a fuel combustion heater and said heated second fluid passed into heat exchange relationship with said liquefied gaseous fluid for vaporizing the same. This improvement comprises preheating said second fluid fed to said fuel combustion heater in a solar heater. A still further aspect of the invention is a process for vaporizing a normally gaseous fluid which is in liquefied state which comprises passing a fuel combustion heated second fluid and a solar heated third fluid into heat exchange relationship with said liquefied gaseous fluid for vaporizing the same.

Accordingly, advantages of the present invention include the especially efficient utilization of solar energy to at least augment, if not totally replace, conventional fuel combustion heaters for vaporizing liquefied gases, such as LNG. Another advantage is an especially efficient solar water heater which can absorb heat from the atmosphere even when freezing ambient (air) temperatures prevail, as well as absorb heat from the sun. These and other advantages will be readily apparent to those skilled in the art from the disclosure contained herein.

BRIEF DESCRIPTION OF THE DRAWINGS

FIGS. 4–7 show schematic flow diagrams of LNG vaporization installations using solar energy for the vaporization. They will be described in detail later in connection with several design operational modes for practice of the present invention.

DETAILED DESCRIPTION OF THE DRAWINGS

Figure 1:
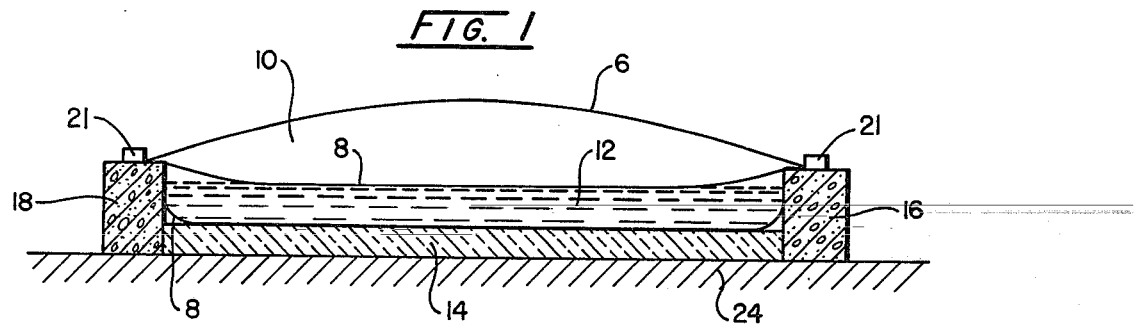
FIG. 1 shows a shallow solar pond module in cross-sectional elevation.

The solar heater of FIG. 1 is a "shallow solar pond" module (hereinafter SSP module). The module is fitted with cover 6 which is transparent or translucent and can be of inflatable material such as plastic or the like, or can be of rigid material such as glass, fiberglass, or the like. Cover 6 can be coated on its underside or otherwise treated to permit solar energy to pass through cover 6 into the heater but prevent escape of reflected energy. Cover 6 is fitted over water sheath 8 to define plenum 10 which can be a dead air space or pressurized air or other gas space for minimizing convective heat loss from the solar heater. In colder climates especially the air in plenum 10 suitably has been dried (e.g. with a desiccant, though the air optionally may contain an antifreeze additive) to prevent freezing of water vapor therein. Water sheath 8 retains the water in pond 12 and is transparent or translucent for permitting solar energy to pass through it and be absorbed by pond 12. Water sheath 8 can be of similar construction as cover 6. The lower layer of water sheath 8 lying on insulation 14 is a black body for absorbing heat to heat pond 12. A paint, coating, or manufactured black color for the lower layer of water sheath 8 can be used as is necessary, desirable, or convenient. The interior of SSP module is retained by concrete piers 16 and 18 which in FIG. 1 have anchors 21 affixed thereto for securing cover 6 and water sheath 8. Insulation 14 prevents undesirable heat loss to ground 24.

A typical SSP module will be about 5.5 by 71.5 meters and preferably constructed of weatherable polyvinyl chloride or other plastic. The depth of water in pond 12 normally will range from about 5 centimeters to 30 centimeters for efficiency of heating pond 12. Multiple modules can be laid together using piers 16 and 18 as common interior walls and/or laid end to end. The modules can be interconnected in a variety of parallel, series, and combination of parallel and series arrangements depending upon the heat demand required of the heated water. For preventing any freezing of the water in pond 12 due to low ambient temperatures and/or heat transfer to cryogenic fluids, for example, a suitable additive will be admixed with the water in pond 12 such as, for example, an anti-freeze such as an alcohol, glycol, glycol ether, salt, ammonia and the like. Further, pond 12 can contain purely a hydrocarbon or hydrocarbon mixture or can be a gaseous fluid such as air or the like. Conventional piping, pumps, headers, feeders, and the like are not shown in FIG. 1 but are to be provided in conventional fashion where necessary, desirable, or convenient. Further, it must be recognized that a variety of other construction designs can be conceived for the SSP module and such will satisfactorily serve to provide heat transfer to normally gaseous fluids in liquefied state for their regasification or vaporization.

The inlet temperature of the water forming pond 12 can range from as low as −40° C. and lower when an anti-freeze additive is admixed with the water to as high as 16°–38° C. or higher depending upon prior conditions of exposure to the water, ambient temperature to which the SSP module is exposed, and heat demand required of the heated water withdrawn from the SSP module. Those skilled in the art will appreciate the various combinations of factors which will be accounted for in designing a suitable SSP module and such is within the skill of those in the art.

Figure 2:
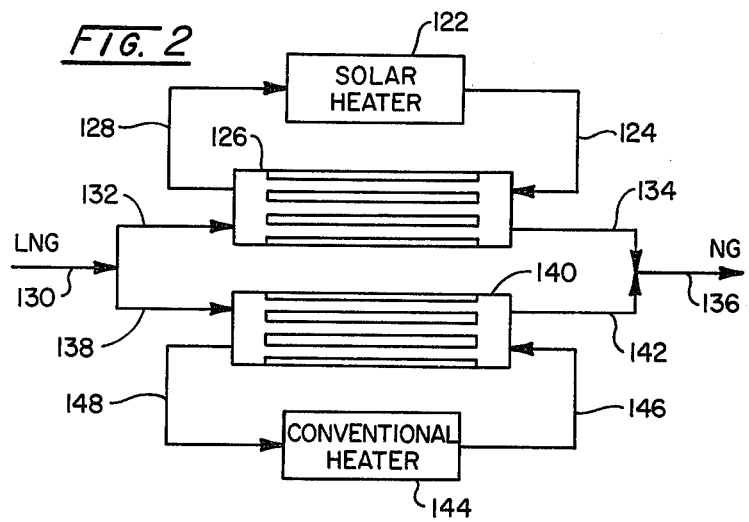
FIG. 2 shows a schematic flow diagram of a solar heater and heat exchanger therefor operating in parallel with a conventional heater and heat exchanger therefor for the vaporization of LNG.

Referring to FIG. 2, solar heater 122 can be used to heat any suitable heating fluid, though such heater preferably is used to heat water for the vaporization of LNG. The hot water from solar heater 122 is passed through line 124 into heat exchanger 126 from which spent cold water is returned to solar heater 122 through line 128. LNG enters the system through line 130 and can be split into two flow paths. Line 132 conveys the LNG into heat exchanger 126 where it is vaporized to form natural gas which is withdrawn from heat exchanger 126 through line 134 and then passed into line 136 for further processing and/or distribution into existing natural gas lines.

Conventional heater 144 can utilize gas burners, coal burners, turbine exhaust gas, or like conventional means for heating water or other heat transfer fluid. The preferable fluid for such conventional heater is water which is withdrawn from heater 144 through line 146 and passed into heat exchanger 140. Spent cold water is withdrawn from heat exchanger 140 and recycled to heater 144 through line 148. Alternatively, heat exchanger 140 and heater 144 can be a single integrated unit wherein the water is internally cycled. The second flow path for the LNG is through line 138 into heat exchanger 140 where it is vaporized to natural gas. Such natural gas is withdrawn from heat exchanger 140 through line 142 and passed into line 136 as described above.

With good solar heat collection, most of the LNG will pass through line 132 into heat exchanger 126 for its vaporization. When insufficient solar energy is available, the LNG can be routed through line 138 into heat exchanger 140 for its vaporization. Suitably, a heat sensor can be installed in line 124 or in solar heater 122 to sense the temperature of the water in order to determine the proportion of LNG which can be passed into heat exchanger 126 for its vaporization. Thus, when the water in solar heater 122 drops in temperature, more LNG will be diverted through line 138 into heat exchanger 140. Typical operating temperatures for such a scheme include the solar heater heating water to about 63° C. for vaporizing LNG entering the system at about −162° C. Natural gas withdrawn from the heat exchangers normally will be about 4° C. in temperature. With an anti-freeze additive added to the water for the solar collector (solar heater 122), the cold water solution withdrawn from the heat exchangers can be in temperature as low as about −40° C. Further, the hot water from either the solar collector or the conventional heater can be passed into heat exchange relationship (heat exchangers not shown) for heating an intermediate heat transfer fluid such as propane or the like and such heated intermediate fluid passed into heat exchange relationship with the LNG for its vaporization. The parallel flow process depicted in FIG. 2 is believed to be a good design for installing a solar collection system at an existing LNG plant which employs conventional heating means for the vaporization of LNG.

Figure 3:
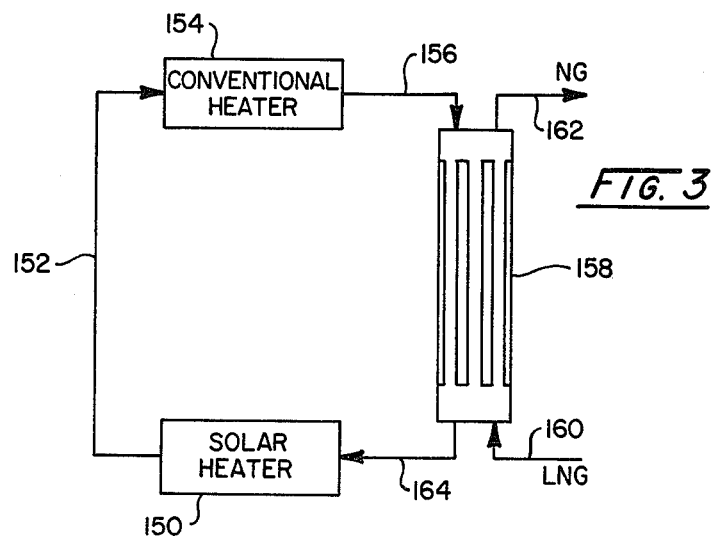
FIG. 3 shows a schematic flow diagram of a solar heater and conventional heater operating in series for the vaporization of LNG.

Referring to FIG. 3, solar heater 150 heats water or other heat transfer fluids noted above. The heated water is withdrawn from solar heater 150 through line 152 and passed into conventional heater 154. Thus, the solar heater is used as a "preheater" for preheating water or other heat transfer fluid for use in a conventional heating system. The conventional heating system can be a conventionally fired burner, waste heat from gas turbines, or the like. The finally-heated water is withdrawn from a conventional heater 154 through line 156 and passed into heat exchanger 158. LNG is passed into heat exchanger 158 through line 160 and vaporized natural gas is withdrawn from heat exchanger 158 through line 162. Spent cold water from heat exchanger 158 is recycled to solar heater 150 through line 164.

The heat required to vaporize the LNG in the series process depicted in FIG. 3 is the heat from the solar collector plus the heat from the conventional heater. With maximum solar heat collection, the heat input from the conventional heater can be nominal or none. With little or no solar heat collection available, the conventional heater can provide up to 100 percent of the heat required to vaporize the LNG. An intermediate heat transfer fluid can be utilized in the series flow process shown in FIG. 3 in conventional fashion, such as described above. Temperatures for all flows in this series flow system can be the same as the temperatures given in connection with the description of FIG. 2 above. It must be recognized that for providing heat transfer to other fluids, different temperatures may be required. Also, different temperatures may be required in the vaporization of LNG, and those temperatures given herein are merely typical operating temperatures under which conventional LNG regasification plants have been operated.

DETAILED DESCRIPTION OF THE INVENTION

A variety of factors, design features, and operational modes ultimately will determine the details of the SSP module, number of modules to be established, the interconnection of multiple SSP modules to various surge tanks, heat exchangers, and the like which are designed in conjunction with the SSP module. Factors include geographic location and climate of the SSP installation, season of operation of the SSP module, particular liquefied fluid to be vaporized (for example, LNG, liquid oxygen, liquid nitrogen, liquid chlorine, or the like), and like factors. Design features of the SSP module and appurtenant installations include intergration of conventional fuel-fired heaters with the solar heaters, particular construction of the SSP module, number of modules established (perhaps limited by open land availability though the modules may be floated on water if desired), type of pond solution used in the SSP module, solar collection efficiency of the SSP module established (frost and dew formation on and in the SSP module, for example, may significantly affect the efficiency of the SSP module), and like design features. The various operational modes are virtually limitless and several commercially viable operational modes will be described in connection with FIGS. 4-7 later herein.

Underlying the above are the economics in establishing large scale solar heater installations, operational costs, and expected useful life of such installations. Still, use of solar energy has many non-economic benefits such as, for example, conservation of fossil and other depletible fuels. The description of the invention which follows addresses some of the foregoing variables, but it must be remembered that custom designing of commercial solar heater systems and their integration into existing or new commercial facilities probably is wise. Those skilled in the art will appreciate fully how to practice the invention from the description herein and also the pertinent variables to be factored into the proper design of a complete solar system.

The invention will be particularly described in detail in connection with the vaporization or regasification of LNG, though this is not a limitation on the present invention. Also, water (or an aqueous solution) is the preferred fluid for solar heating and the description herein will be with respect to water, though this is not a limitation of the invention. The solar heater modules can vary from a few in number to virtually thousands of them covering up to several hundred acres of ground, depending upon the energy requirements of such solar heater system. LNG usually is at a temperature of about $-162°$ C. though this temperature can vary significantly as noted above. Preferably, the LNG is heated to about 4° C. or thereabouts to convert it to natural gas for further processing for eventual distribution into existing gas lines. Typical commercial LNG vaporization installations can produce up to 28 million standard cubic meters (SCM) of vaporized natural gas daily so that energy requirements for such vaporization process can amount to billions of gram-calories per year.

For SSP modules, solar energy collection efficiency increases with decreasing average pond temperature. The average pond temperature (temperature of the water or other liquid fluid to be heated in the solar heater) can be lowered by increasing the depth of the water, for example. Use of an organic pond solution (for example, an alcohol, glycol, hydrocarbon, or the like) permits very low inlet pond temperatures for increasing the solar energy collection efficiency of the solar heater. For solar water heaters, the addition of an antifreeze additive to the water also permits very low inlet temperatures of the water solution to be practiced (for example, as low as $-40°$ C. and lower) and, thereby, improve the solar collection efficiency of the solar water heater. Higher solar energy collection efficiencies can translate into relatively lower final solution temperatures for relatively larger throughput volumes of solution or can translate into relatively higher final solution temperatures for relatively smaller throughput volumes of solution, depending upon the capacity of the solar heater and volumetric flow rate of solution through the heater. Volumetric flow rates of the solution in the present invention generally are adjusted and maintained to achieve the former result. The outlet temperature of the solution from the solar heater, in turn, is an important factor in determining heat exchanger size when the solar heated solution is to be passed into heat exchange relationship with another fluid. Usually, minimum area of the heat exchanger is an important design variable for minimizing costs of the heat exchanger.

The foregoing can be illustrated by studying the effects of the pond depth and average solution temperature for a model SSP operating in a locale at which the total solar flux is known. For purposes of this illustration, the chosen sight was the Washington, D.C. area for which SOLMET (Solar Radiation-Surface Meteorological Observations) information is available from the United States Department of Commerce, National Oceanic and Atmospheric Administration, Environmental Data Service. The SOLMET information provides the daily total solar flux for the Washington-Sterling, D.C. area (as well as other locales) as compiled by the National Weather Service. For purposes of this illustration, the 1972 solar flux information was used with the "best day" solar radiation being 697 gram-calories per square centimeter per day as recorded for June 22, 1972. This location strictly is for purposes of illustration of the invention and in no way is a limitation of the invention. The solar collection efficiency for a model SSP module was determined from an empirical equation developed by Dickinson et al for Lawrence Livermore Laboratory and can be found in preprint UCRL-78288, revision 1 (June 17, 1976), for presentation at the International Solar Energy Society, Solar Energy Conference '76, Winnipeg, Manitoba, Canada, Aug. 15-20, 1976. The empirical equation is based upon the Hottel-Whillier-Bliss model given at page 6 as equation 2 in the cited preprint. The empirical equation developed by Dickinson et al is found on page 12, FIG. 4 of the preprint and can be expressed as follows:

$$N_i = 0.75 - 1.3 \left[ \frac{\Delta T}{I} \right], \text{ where}$$

$N_i$ = collection efficiency
$\Delta T$ = water temperature-ambient (air) temperature (°F.)
$I$ = Total solar flux incident on SSP (BTU/Square ft/Hour)

The pond depth and average solution temperature are independent variables in the empirical equation and determine the final solution temperature and collection efficiency of the SSP module. The collection efficiency is defined as the net energy collected divided by the total radiation or total flux incident upon the SSP module. For comparative purposes, the SSP is compared to a representative commercial gas-fired heat exchange system designed for LNG vaporization wherein natural gas fired heaters are used to heat water which is passed through a heat exchanger to vaporize the LNG. The LNG is assumed to enter into the heat exchangers at $-162°$ C. and leave in vaporized form at 4° C. using hot water heated by the gas firing heaters to 42° C. The relative heat exchanger size required for the solar system compared to the size required for the conventional gas heating system is calculated from the "log mean temperature drop" (LMTD) for each heat exchange system. The LMTD is used in design of heat exchangers and can be calculated from the entrance and exit temperatures of fluids passing through the heat exchanger. The LMTD equation can be found in the Chemical Engineer's Handbook, Fifth Edition, R. H. Perry and C. H. Chilton, Section 10, page 10, equation 10-27, McGraw-Hill Book Company, New York, New York (1973), the disclosure of which is expressly incorporated herein by reference. For the SSP module operating with entry solution temperatures of less than 0° C., it was assumed that methanol (45% by weight) was added to the water in order to prevent freezing of the water. The following table displays the operation parameters and results that would be obtained for such a model SSP module.

TABLE I

| Pond Depth (cm) | Solution Temp. (°C.) | | Collection Efficiency (%) | | | Log Mean Temp. Drop (°C.) | Relative Heat Exchanger Size | % Methanol |
| --- | --- | --- | --- | --- | --- | --- | --- | --- |
| | Minimum | Maximum | Day | Night | Total | | | |
| 5.08 | 16 | 63 | 34 | 0 | 34 | 107 | 0.91 | 0 |
| | 4 | 62 | 39 | 3 | 42 | 102 | 0.96 | 0 |
| | −40 | 62 | 39 | 18 | 57 | 86 | 1.14 | 45 |
| 10.16 | 24 | 55 | 45 | 0 | 45 | 104 | 0.94 | 0 |
| | 16 | 52 | 53 | 0 | 53 | 98 | 0.99 | 0 |
| | 4 | 48 | 61 | 3 | 64 | 92 | 1.07 | 0 |
| | −40 | 48 | 74 | 24 | 97 | 76 | 1.28 | 45 |
| 20.32 | 16 | 38 | 66 | 0 | 66 | 87 | 1.13 | 0 |
| | 4 | 32 | 78 | 4 | 82 | 77 | 1.27 | 0 |
| | −40 | 21 | 108 | 27 | 135 | 53 | 1.85 | 45 |
| 30.48 | 16 | 32 | 72 | 0 | 72 | 81 | 1.21 | 0 |
| | 4 | 24 | 84 | 4 | 88 | 69 | 1.42 | 0 |
| | −40 | 6 | 124 | 29 | 153 | 26 | 3.83 | 45 |

Several valuable results are seen from the foregoing Table. First, it should be noted that the solar energy collection efficiency increases with increasing pond depth and with decreasing minimum solution temperature (i.e. entry temperature of water to SSP module). Second, the nighttime contribution to energy collection increases with decreasing minimum solution temperature. Normally, the net energy collected is the solar energy collected minus the heat lost to the environment. With minimum solution temperatures of less than the ambient temperature, however, the solution in the SSP module will gain heat from the surrounding ambient air (even if the ambient air is at a temperature of less than 0° C. with an anti-freeze additive admixed with the water), providing that the entry temperature of the solution to the SSP module is lower than the ambient temperature. Third, it can be seen that collection efficiencies of greater than 100% of the available solar energy can be realized from the SSP module at very low minimum solution temperatures and increasing pond depths. Such collection efficiencies of greater than 100% are possible because the solution in the SSP module extracts a significant amount of heat from the surrounding atmospheric air due to the extremely low minimum solution temperatures which are possible provided that the water also contains an additive which prevents freezing of the water. Last, it can be seen that the relative heat exchanger size between a heat exchanger required for an SSP module system operating as described in Table I and a heat exchanger for a conventional gas-fired heater system can be comparable under many circumstances.

An SSP system probably is best designed on the basis of the maximum solar flux or radiation available in a given area on the best day of the year. Such a system would supply all of the energy on the best day for vaporizing the LNG and would be the most cost effective because it would require a minimum solar collector area per unit energy utilized. LNG would be vaporized with such a designed system when sufficient energy is provided from the system, and would be supplemented with natural gas or other conventional fuel heaters when insufficient energy from the solar system is available.

Several operating schemes or modes of the solar heater system based on the foregoing design are possible. Such a solar system could be operated on a batch basis or continuously, as well as modified versions of both such schemes. Certainly, an almost limitless number of operating modes can be conceived for practice of the invention. In order to illustrate some of the various modes under which the invention can be practiced, four preferred operating modes are illustrated below in connection with FIGS. 4–7. of the drawings.

OPERATIONAL MODES

Nighttime Batch Operation

FIG. 4 depicts a nighttime (15 hours) batch operation for using solar energy for the vaporization of LNG. This mode is designed to heat water or other solution in the solar pond during the daytime hours and use the thus-heated water at night only for the LNG vaporization. Referring to FIG. 4 and the sample time sequence given thereon, at 8:00 a.m. SSP module 4 (like that shown and described in FIG. 1) is filled with cold water making up pond 5. Insulation 6 prevents heat loss from the water or other solution in pond 5. Between the hours of 8:00 a.m. and 4:30 p.m., solar energy is collected by SSP module 4 and pond 5 therein is heated to produce hot water (desirably at about 35°–65° C.). At 4:30 p.m. the maximum temperature of pond 5 has been reached so that valve 8 is opened for the hot water to flow through line 10 into hot water storage tank 12. At 5:00 p.m. when all of the hot water from SSP module 4 has been transferred into tank 12, valve 8 is closed and hot water contained in tank 12 flows through line 14 through open valve 16 into heat exchanger 18. LNG enters heat exchanger 18 through inlet 20 and by transfer of heat from the hot water therein is vaporized or regasified into vaporous natural gas which exits heat exchanger 18 through outlet 22. The LNG enters at about −162° C. and the vaporized natural gas is withdrawn from heat exchanger 18 at about 4° C. The vaporization process is scheduled to operate between the hours of 5:00 p.m. and 8:00 a.m. the following day, thus the "15 hour" batch operation time period. Cold water from heat exchanger 18 flows through open valve 24 through line 26 and open valve 28 continuously into module 4 for forming pond 5 for reheating the following day. Valve 8 is closed while the pond is being filled with cold water. Tank 12 has a sufficient capacity for retaining hot water to vaporize the LNG during such 15 hour time sequence. At 8:00 a.m. the following day, the sequence is repeated.

It should be understood in connection with the operational modes herein, that the modules depicted are representative of a system of SSP modules which can range from a few in number to hundreds of modules covering hundreds of acres of ground. Such modules can be interconnected in various series and parallel flow arrangements and provided with inlet and outlet piping arrangements to suit the particular needs of the plant. Also, while the pond will be described in connection with water, it should be realized that a variety of fluids may be used to form the pond as described above. Also, the time sequence described is merely illustrative and is not a limitation of the present invention.

Daytime Continuous Operation

FIG. 5 depicts a daytime (9 hour) continuous operation for practice of the present invention. The basic concept for this operation is to heat the water in the SSP module during the daytime (about 9 hours) and to continuously vaporize LNG with such heated water during such 9-hour operating day. Referring to FIG. 5 and the time sequence given thereon, SSP module 30 is like that described in connection with FIG. 1 and retains pond 31 for heating therein. Insulation 32 prevents heat loss from SSP module 30 and insulates retention tanks 34. Retention tanks 34 suitably can be a single tank for retention of hot water from one or several SSP modules or can be a series of tanks for retaining water from a series of modules. Piping for retention tanks 34 (not shown) is to be provided in conventional engineering fashion. In operating this mode, hot water heated in SSP module 30 during the 9-hour operating day continuously is passed from 8:00 a.m. through 5:00 p.m. through line 35, open valve 36 and line 37 into heat exchanger 38. LNG enters heat exchanger 38 through inlet 40 and vaporized natural gas is withdrawn from heat exchanger 38 through outlet 42. Cold water withdrawn from heat exchanger 38 during the day continuously passes through line 44, open valve 46, and line 47 into SSP module 30 to form pond 31 for heating during the day. At about 5:00 p.m. when solar collection ceases, heated water in pond 31 is transferred into retention tanks 34 for overnight storage. This hot water is stored so that at the beginning of the next day's operation at around 8:00 a.m. there is a minimum of lag time in commencing the LNG vaporization. Without such heated water being available at the start of the day, there would be significant time required for water to be heated in SSP 30 so that LNG vaporization could begin. Thus, this mode provides continuous heating of water in the SSP module and continuous vaporization of LNG only during the daytime or 9-hour time sequence shown in FIG. 5 with the provision of stored hot water to ensure prompt start-up of the process each morning.

24 Hour Batch Operation

FIG. 6 depicts a 24-hour batch operation mode for practice of the present invention. This mode of operation is designed to vaporize LNG continuously from batches of stored hot water. Referring to FIG. 6 and the time sequence shown thereon, SSP module 48 retains pond 49 which is insulated from heat loss by insulation 50. At 8:00 a.m., pond 49 is filled with cold water from the heat exchanger system. Between 8:00 a.m. and 4:30 p.m. the water in the pond is heated from the sun. When the water reaches a maximum temperature around 4:30 p.m. the hot water flows out of module 48 through valve 52, through line 54 into hot water storage tank 56. While the water in pond 49 is being heated during the day, tank 56 which contains hot water heated from a prior day continuously is passed from tank 56 through line 58 into heat exchanger 60. LNG enters heat exchanger 60 through inlet 62 and in vaporized form the natural gas is withdrawn from exchanger 60 through outlet 64.

Cold water is withdrawn from exchanger 60 through line 66 and during the daytime passes through valve 68 into cold water storage tank 70. At 5:00 p.m. when the water in pond 49 has reached its maximum temperature and has been collected in tank 56, the cold water stored in tank 70 is withdrawn therefrom through line 72, open valve 74, line 76, open valve 78, and into module 48 for forming pond 49 for heating the following day. After 5:00 p.m., also, cold water from exchanger 60 can pass from line 66 through the indicated tee into line 80 with valve 82 being open, and through line 84 for combining with the water in line 76 for passage into module 48 to form pond 49. Between the hours of about 5:00 p.m. and 8:00 a.m. the following day, the hot water from tank 56 continuously is passed into exchanger 60 for vaporization of the LNG. If the temperature of the water passed into pond 49 is lower than the ambient temperature, then pond 49 also will be heated to a degree during the night. The sequence as explained above then is repeated the following day.

24 Hour Continuous Operation

FIG. 7 depicts a 24 hour continuous operation mode for practice of the present invention. In this mode of operation, LNG continuously is vaporized and cold water from such vaporization operation continuously is returned to the solar system. Referring to FIG. 7 and the sample time sequence given thereon, SSP module 86 retains pond 90 and has insulation 88 for prevention of heat loss therefrom. Also, retention tanks 91 are insulated by insulation 88. The description of the retention tanks given in the Daytime Continuous Operation mode discussed above applies for this mode also. At 8:00 a.m. hot water in retention tanks 91 is withdrawn therefrom and passed with SSP module 86 for forming pond 90. The use of this stored hot water at the beginning of the day is to minimize the time lag that would otherwise develop by having to heat up cold water at the start of the day. Of course, cold water can be metered into SSP module 86 along with the stored hot water, if desired. Line 92 from SSP module 86 has two pathways which include line 92 through open valve 102 and thence into tank 104 for storage of hot water, and into line 94. The hot water from tank 104 passes through line 106, through valve 108, and thence into line 100 for admission to heat exchanger 112. During the daylight hours, however, valve 108 is in a closed position so that hot water is retained within tank 104 and hot water from SSP module 86 flows through line 94, through open valve 96, line 98, and line 100 for admission to heat exchanger 112. At about 5:00 p.m. until 8:00 a.m. the following day, the vaporization is accomplished by the hot water which is stored in tank 104. Heat exchanger 112 has LNG passed thereinto through inlet 114 and vaporized natural gas withdrawn through line 116. The spent or cold water from exchanger 112 is withdrawn therefrom through line 118 and returned to SSP module 86 for forming pond 90. The sequence as described then is continued for the next day for vaporization of LNG on a continuous 24-hour basis.

Regardless of the particular operational mode chosen for practice of the present invention, the cold water withdrawn from the heat exchanger (or heat exchangers) need not entirely be returned to the solar heater for additional heating. Especially when an anti-freeze additive is incorporated into the water and the temperature of the water withdrawn from the heat exchanger is relatively low (e.g. as low as about −40° C.), at least a portion of such cold water can be used as a refrigerant for a variety of conventional purposes as those skilled in the art will appreciate. Also, some of the hot water withdrawn from the solar heater may be used as a heating fluid for purposes other than vaporization of LNG or other normally gaseous fluids in liquefied state. Preferably, though, all of the hot water from the solar heater is used for the vaporization of LNG.

In order to further illustrate the magnitude of contribution of solar energy to LNG vaporization, for example, the performance of an SSP system operated substantially in accordance with the "24-hour Batch Operation" described above and shown in FIG. 6 was calculated for three minimum pond temperatures (minimum pond temperature being the temperature at which the water is withdrawn from the heat exchanger and passed into the SSP system). The pond depth was assumed to be 10.2 cm and the solar flux or radiation data used to calculate the performance of the SSP system was from the SOLMET system as described previously. The following Table shows the calculated performance of the SSP system for its best day performance (June 22, 1972) and for its annual performance. In calculating the annual performance, it was assumed that the SSP system is designed to produce 28 million SCM/day (one billion SCF/day) of vaporized natural gas. This assumption is particularly reflected in the "Pond Area" and "Total Energy Required" entries in the Table. Further, the last entry in the Table, "Gas Saved", reflects the amount of gas that would be saved by implementation of the SSP system for the LNG vaporization rather than using natural gas heaters to heat water for such vaporization.

TABLE II

|  | Minimum Pond Temperature (°C.) | | |
| --- | --- | --- | --- |
|  | 16 | 4 | −40[1] |
| Best Day Performance | | | |
| % Energy Collection Efficiency | 53 | 64 | 97 |
| Heat Collected (gm-Cal/cm$^2$/day) | 369 | 448 | 678 |
| Heat Production (10$^{10}$ gm-Cal/day) | 378 | 378 | 378 |
| Pond Area (10$^4$ meters$^2$) | 102 | 85 | 56 |
| (Acres) | 253 | 209 | 138 |
| Annual Performance | | | |
| Solar Radiation (10$^3$ gm-Cal/cm$^2$/year) | 113 | 113 | 113 |
| % Energy Collection Efficiency | 51 | 72 | 154 |
| Energy Collected (10$^3$ gm-Cal/cm$^2$/year) | 58 | 82 | 174 |

TABLE II-continued

|  | Minimum Pond Temperature (°C.) | | |
| --- | --- | --- | --- |
|  | 16 | 4 | −40[1] |
| Total Energy Collected (10$^{12}$ gm-Cal/year) | 587 | 690 | 969 |
| Total Energy Required (10$^{12}$ gm-Cal/year) | 1,393 | 1,393 | 1,393 |
| Annual Solar Assist (%) | 42 | 50 | 70 |
| July Solar Assist (%) | 84 | 88 | 93 |
| December Solar Assist (%) | 6 | 14 | 46 |
| Best Day Solar Assist (%) | 100 | 100 | 100 |
| Gas Saved, 10$^{12}$ SCM/year[2] | 58 | 69 | 96 |

[1] Pond water contains 45% METHANOL
[2] Assuming 1006 × 10$^4$ gm-Cal/SCM

Clearly reflected in the above-tabulated results is the fact that the lower the minimum pond temperature, the less area of pond required to vaporize the LNG and the greater efficiency the SSP system has. Such improved efficiency is due, in part, to the ability of the pond to absorb heat during the nighttime hours (provided that the ambient temperature is greater than the minimum pond temperature of −40° C.), as well as to the improved efficiency which the lower pond temperature is expected to provide during daylight hours. Even during the winter months assuming typical winter-time temperatures as found in Washington, D.C. area (used for the calculations herein as described above for the SOLMET information), the above-tabulated results clearly show that the contribution of solar energy in the LNG vaporization is 46 percent during December for a minimum pond temperature of −40° C. During such time periods when the SSP system is unable to provide the full heat requirements for vaporization of the LNG, conventional gas-fired heaters can be used to heat water for passage into the heat exchangers for vaporization of the LNG.

It will become apparent to those skilled in the art that a variety of modifications and alternative operating modes are possible for practicing the present invention. For example, the solar heated water (or other fluid) may be used to heat an intermediate heat transfer fluid which heated fluid is used to vaporize the LNG. Appropriate heat transfer fluids include, for example, petroleum hydrocarbons, such as propane, isobutane, isopentane, propylene, 1-butene or 1-pentene; or a fluorinated hydrocarbon such as monochloro-difluoromethane or dichloro-difluoromethane; and mixtures thereof. Such fluids even could be heated in the solar heater. In this application, all percentages and proportions are by weight and all units are in the metric system, unless otherwise expressly indicated. Also, all citations herein are expressly incorporated by reference.

We claim:

1. Apparatus for vaporizing liquefied natural gas and the like comprising in combination solar heater means, a secondary source of heat and a heat exchanger means; the solar heater means including a liquid with a freezing point below about −40° C. which is located within a structure having an open top for exposure to the rays of the sun; a plenum chamber filled with dry gaseous material located above the liquid, said plenum chamber comprises a cover in contact with ambient air and a water sheath adjacent said liquid, said chamber extending completely across the top of the structure to prevent contact between said liquid and ambient air, said cover and water sheath both being translucent to allow the rays of the sun to pass therethrough and into said liquid;

inlet and outlet means in said structure to permit said liquid to be withdrawn and reinserted; said inlet and outlet means being connected by liquid conducting means to said heat exchanger means;

means for forcing the liquid to flow from the structure, through the heat exchanger means and back to the structure;

the secondary source of heat including means for heating a fluid, means for conducting said fluid from said secondary source through said heat exchanger means and back to said secondary source;

means for conducting liquefied natural gas at a temperature of below about $-162°$ C. through said heat exchanger means whereby it exists said exchanger above about $4°$ C.;

said heat exchanger means comprising two heat exchangers arranged in parallel, one of said exchangers being connected to the solar heater and the other being connected to the secondary source of heat; and the means for conducting the liquefied natural gas to the heat exchanger means comprises two flow paths, one through each exchanger.

2. The apparatus of claim 1 including a storage tank in the liquid conducting means between the solar heater and the heat exchanger means for storing heated liquid.

3. The apparatus of claim 2 wherein said liquid comprises water, optionally admixed with between about 1 percent and about 60 percent by weight of an alcohol, a glycol, or a mixture thereof.

4. The apparatus of claim 1 wherein said liquid comprises water, optionally admixed with between about 1 percent and about 60 percent by weight of an alcohol, a glycol, or a mixture thereof.

* * * * *